Sept. 17, 1963

H. E. EIRHART, JR 3,104,096

LAMINATED TORSION SPRING

Filed July 3, 1961

FIG. 1

FIG. 2

HARRY E. EIRHART, Jr
INVENTOR.

BY John R. Faulkner
Clifford L. Sadler

ATTORNEYS

# United States Patent Office 3,104,096
Patented Sept. 17, 1963

3,104,096
LAMINATED TORSION SPRING
Harry E. Eirhart, Jr., Detroit, Mich., assignor to Ford Motor Company, Dearborn, Mich., a corporation of Delaware
Filed July 3, 1961, Ser. No. 121,742
8 Claims. (Cl. 267—57)

The present invention relates to torsion springs and more particularly to such a spring formed from laminated leaf spring elements.

Torsional springs as distinguished from coil springs or bending springs have certain distinct advantages, such as, simplicity of structure and economy of space in installation. Conventionally, torsion springs are formed from rod or bar stock. These torsion bars are relatively expensive to manufacture and require specialized fabricating equipment. An alternate design to a solid torsion bar is the use of a plurality of leaf spring strips that are secured together and appropriately mounted for application as a torsional spring. The principal problem associated with the use of laminated leaf type torsion springs is encountered in securing the spring leaf ends for loading purposes.

In view of the state of the art, it is an object of the present invention to provide a laminated leaf type torsion spring in which the spring ends are secured by wedge devices.

More specifically, the present invention provides a torsional spring formed from a series of individual flat leaf spring elements that are stacked to form a sandwich construction. The stacked springs are inserted as a group into a rectangular socket having converging walls. In one embodiment of the present invention, a threaded plug is employed to force wedge members along the inclined socket walls to engage and grip the spring ends. In another embodiment, the securing force is exerted by the spring elements themselves against wedge members seated in the socket.

The foregoing objects and advantages of the present invention will come amply clear from the following description and the accompanying drawing in which:

FIGURE 1 is an elevational view partly in section of the leaf spring attaching construction of the present invention; and FIGURE 2 is a sectional view taken along section lines 2—2 of FIGURE 1.

Referring now to the drawings for a detailed understanding of this invention, the left and right hand end of a leaf spring is shown secured in position by two different embodiments of this invention.

The spring itself consists of a series of flat elongated leaf spring elements 10 which are stacked so as to provide an assemblage 12 having a rectangular cross-section. Connecting devices are used to load the ends of the stacked set of springs 10 in torsion.

Referring to the left-hand end of FIGURE 1, socket member 14 is provided which may be secured to a suspension arm of a vehicle or to any other mechanism requiring a torsion spring. A vehicle suspension is cited as a typical installation of such a device. The socket 14 has an interior with a rectangular configuration. The spacing of the socket side walls 16 is slightly greater than the width of the individual spring elements 10. Socket height is significantly greater than the spring 12 to accommodate assemblage of the connecting device.

The upper and lower walls 18 of the socket 14 are inclined to converge towards an external point. Each surface 18 has a ramp angle A. The end of the spring 12 is fitted into the socket and engaged by wedges 20 which have a flat side in contact with the inclined wall 18 and a rounded face in engagement with the extreme upper and lower leaf spring elements 10. The contact is substantially a straight line.

At the depth of the socket 10 an abutting plate 22 is provided which contacts the end of the wedges 20. A threaded plug 24 is received in the socket 14 and engages the abutting plate 22.

By tightening the plug 24 the wedges 20 are forced in a converging direction to grasp the spring 12 due to the inclination of ramp angle A. The gripping action of the wedge members 20 resulting from their engagement with the inclined wall surfaces 18, causes the laminations of spring elements 10 making up the total spring 12 to be secured tightly together. This construction provides a much simplified leaf spring end attachment which is readily loaded in torsion by securing the socket 14 to an appropriate member.

The structure has the further advantage that the inactive portion of the spring 12 is reduced to a minimum. With the present invention, an inactive spring portion exists only between the end face of the spring elements 10 and the point of engagement of the wedges 20 as indicated by the dimension B.

Referring to the right-hand side of FIGURE 1, we see an alternate leaf type torsion spring attaching structure conceived in accordance with the present invention. In this construction a receiving socket 30 has upper and lower walls 32 which converge inwardly rather than outwardly as is the case with walls 18. The walls 32 diverge at a ramp angle A'. The ends of springs 10 are grouped together and secured by J-shaped wedges 34. The J-shaped members each have a rounded end which engages the leaf spring, a flat foot portion which engages the inclined wall 32 and a flat body portion that abuts against the spring end. An elastomeric block 36 is seated in the depth of the socket 30 against the body portion of the J-shaped devices 34.

By loading the leaf spring 12 axially so as to force the end thereof into the socket 30, the wedge members 34 converge and press against the spring. The members 34 are held in place by the elastomeric block 36. The members 34 grip the spring end 12 in an identical fashion to the structure at the left. The inactive end portion of the spring 12 is held to a minimum, as indicated by the reference dimension B'.

The principal distinction between the structures at the right and left of FIGURE 1 is that by using a threaded plug the attachment of the laminated leaf springs is completely self contained, whereas with the structure at the right, an external thrust force is required to bring the wedges into engagement with the spring.

In an actual spring installation it is contemplated that one end of the spring may be retained by one embodiment and the opposite end by the other embodiment.

The foregoing invention presents a simplified attaching construction for laminated leaf springs which keeps the inactive portion of the spring to a minimum. Modifications and alterations of this invention may occur to those skilled in the art which will come within the scope and spirit of the following claims.

I claim:

1. A spring device having a socket with converging walls, an end portion of a spring member received in said socket intermediate said walls, a plurality of wedge members in said socket, at least one wedge member positioned intermediate the spring member and one of said converging walls, said wedge member having a plane surface abutting said converging wall and an arcuate surface opposite said plane surface, a thrust means received in said socket, said thrust means adapted to force the arcuate surface of said wedge member into gripping engagement with said spring member to retain said one end of the latter in said connection.

2. A leaf spring device having a socket with converging walls, an end portion of a leaf spring received in said socket intermediate said walls, a pair of wedge members in said socket, each wedge member having one plane surface adjacent one of said converging walls and an arcuate surface opposite said plane surface, a thrust device received in said socket and adapted to force the plane surface of each wedge member into engagement with the converging wall to cause the arcuate surface opposite said plane surface of each wedge member into gripping engagement with an outer surface of said leaf spring respectively to secure the end portion of the leaf spring in said connection.

3. A leaf spring device having a socket with converging walls, a plurality of flat spring leaves positioned within said socket, a pair of wedge members in said socket with each wedge member having one plane surface in contact with one of said converging walls and an arcuate surface opposite said plane surface, a thrust device threadably received in said socket and adapted to force the arcuate surfaces of said wedge members in straight line contact with the outer leaxes of said pluarlity of flat spring leaves to hold the latter in said connection.

4. A leaf spring device having a socket with converging walls, an end of a leaf spring comprising a plurality of flat spring leaves positioned in said socket intermediate said walls, a pair of wedge members in said socket, each wedge member positioned intermediate each outer leaf and one of said converging walls, each wedge member having a plane surface abutting said one of the converging walls and an arcuate portion engaging said outer leaf, a thrust means in said socket movable towards said end of the leaf spring, said thrust means upon being moved forcing the plane surface of each wedge member along said converging walls until said arcuate surface of each wedge member grips the outer leaf of said leaf spring to retain the end of the leaf spring in said connection.

5. A spring device comprising a socket having an inner end wall and two side walls converging towards said end wall, an elastomeric member positioned adjacent said inner end wall, a plurality of wedge members in said socket, each wedge member having a first surface abutting one side wall, a second surface abutting a portion of said elastomeric member and a rounded end portion facing inwardly of said socket, one end of a leaf spring being received in said socket to force said rounded end portion of the wedge member into engagement with said leaf spring.

6. A spring device comprising a socket having an inner end wall and two side walls converging towards said end wall, an elastomeric block positioned adjacent said inner end wall, a pair of wedge members in said socket, each wedge member having a flat surface engaging one of said converging walls of said block, and a curved end portion facing inwardly of said socket, a laminated stack of flat leaf springs inserted in said socket between said wedge members to force the curved end portions of said pair of wedge members into engagement with the outer leaves of said laminated stack of flat leaf springs.

7. A spring device comprising a socket having an inner end wall and two side walls converging towards said end wall, an elastomeric block positioned adjacent said inner end wall in said socket, a pair of generally J-shaped wedges in said socket, said J-shaped wedges having a flat foot portion engaging one of said converging walls, a flat body portion abutting said block, and a rounded end portion facing inwardly of said socket, a laminated stack of flat leaf springs inserted in said socket to engage said body portion of said J-shaped members to force the rounded end portions of said pair of J-shaped members into engagement with the outer leaves of said laminated stack of flat leaf springs.

8. The combination of claim 7 wherein said rounded end portions of said J-shaped wedges engage the outer leaves with substantially straight line contact.

References Cited in the file of this patent

UNITED STATES PATENTS

| | | |
|---|---|---|
| 531,715 | Brown | Jan. 1, 1895 |
| 668,830 | Docharty et al. | Feb. 26, 1901 |
| 818,277 | McElvaney | Apr. 17, 1906 |

FOREIGN PATENTS

| | | |
|---|---|---|
| 245,416 | Switzerland | July 16, 1947 |
| 254,042 | Switzerland | Dec. 1, 1948 |
| 166,007 | Sweden | Jan. 20, 1959 |